(12) United States Patent
Provkin

(10) Patent No.: US 9,984,216 B2
(45) Date of Patent: May 29, 2018

(54) AUTHENTICATION DEVICE AND METHOD

(71) Applicant: Andrey A. Provkin, Moscow (RU)

(72) Inventor: Andrey A. Provkin, Moscow (RU)

( * ) Notice: Subject to any disclaimer, the term of this patent is extended or adjusted under 35 U.S.C. 154(b) by 0 days. days.

(21) Appl. No.: 14/998,438

(22) PCT Filed: Jul. 1, 2014

(86) PCT No.: PCT/RU2014/000480
§ 371 (c)(1),
(2) Date: Dec. 12, 2016

(87) PCT Pub. No.: WO2015/009201
PCT Pub. Date: Jan. 22, 2015

(65) Prior Publication Data
US 2017/0116397 A1    Apr. 27, 2017

(30) Foreign Application Priority Data
Jul. 17, 2013    (RU) ................................ 2013133076

(51) Int. Cl.
*G06K 19/06* (2006.01)
*G06F 21/31* (2013.01)
*G06F 21/62* (2013.01)

(52) U.S. Cl.
CPC .......... *G06F 21/31* (2013.01); *G06F 21/6218* (2013.01)

(58) Field of Classification Search
CPC ............ G06K 19/07749; G07F 7/1008; G06Q 20/341

USPC .................................................. 235/492, 375
See application file for complete search history.

(56) References Cited

U.S. PATENT DOCUMENTS

| 8,190,906 B1 * | 5/2012 | Elbeery ................... G06F 21/34 713/156 |
| 9,130,753 B1 * | 9/2015 | Kronrod ................... H04L 9/30 |
| 9,787,673 B2 * | 10/2017 | Johansson ........... H04L 63/0838 |
| 2012/0084804 A1 * | 4/2012 | Simmons ......... H04N 21/25816 725/28 |
| 2015/0256973 A1 * | 9/2015 | Raounak ................. H04L 67/22 726/7 |

* cited by examiner

*Primary Examiner* — Ahshik Kim

(57) ABSTRACT

A method and system for user authentication on a touch-screen device using an authentication token. A housing of the authentication token includes several electrodes. At least one of the electrodes is located on the upper side of the token in order for the user to hold the token. The token is applied onto a touch-screen of the user mobile device by the user holding the electrode. Other electrodes are located on the other (lower) side of the token housing. These electrodes come in contact with the touch-screen during the authentication procedure. The token contains executive units connected to the electrode held by the user and to at least one of the electrodes applied to the touch-screen. Since the electric connection between the token electrodes exists, the touch-screen sensors register a touch at the point of application of the electrode(s).

24 Claims, 3 Drawing Sheets

AUTHENTICATION DEVICE AND METHOD

CROSS-REFERENCE TO RELATED APPLICATION

This Application is a US National Phase of PCT/RU2014/000480 filed on Jul. 1, 2014 having a priority of Jul. 17, 2013.

BACKGROUND OF THE INVENTION

Field of the Invention

This invention relates to a method for user authentication, and more particularly, to a user authentication on a touch-screen device using an authentication token.

Description of the Related Art

Volumes of data stored in a digital form constantly increase. This data can be stored on electronic devices used as an access point to Internet or to enterprise data stores. At the same time personal mobile devices with touch screen capabilities are widely used for work in the office or on the road. Bring Your Own Device (BYOD) policies are used by many enterprises. However, use of personal devices increases the risk of critical data (personal or work-related) being accessed by unauthorized users in the office or in case when user mobile device is lost or stolen. This data security problem is addressed by user authentication.

Conventional methods of user authentication use a password typically entered into the device via a keyboard (physical or on a touch-screen). However, a strong password, which cannot be easily guessed, requires a large number of symbols that are hard to remember. Users often write such a password somewhere, which compromises security of data stored on the user mobile device. Another conventional method of authentication is biometric based authentication. This method requires either connection of a biometric reader or integration of such reader into a mobile device.

Yet another method of user authentication is a token based authentication. The following conventional authentication tokens are used:

- remote (non-contact) tokens (e.g., tokens that use RFID, NFC and Bluetooth protocols);
- plug-in tokens connected over a USB or 1-Wire connectors;
- disconnected tokens—a token displaying authentication data on its screen for user to read and enter on another device (e.g., a specialized token or a mobile device receiving authentication data as an SMS or an MMS).

However, use of plug-in tokens is not convenient because a user has to connect the token to his small mobile device a number of times during the day. The token or the connection port can break easily with daily use. Furthermore, a user can forget to turn off the token and the mobile device becomes vulnerable in case of it being left unattended, lost or stolen. The use of the remote tokens is not secure because of a possibility of the authentication data being intercepted. The data transmission protocols are not sufficiently protected especially when used in uncontrolled zones. New vulnerabilities of these transmission protocols are being discovered quite often.

Manual entry of the authentication data received via SMS limits the length of the authentication string, which can be read and entered by a user. Additionally, a risk of a visual interception of the authentication data is increased. A non-contact token can be implemented by passing data through the touch-screen as, for example, described in http://***.printechnologics.com/our-products/touchcode.html. A paper card can have a special film with certain electric capacity parameters applied on it. This card is applied to the screen and triggers display sensors to emulate multiple touches on the touch-screen. However, this method is limited by data written on the card that cannot be change or modified. The actual authentication data is rather small and does not provide for a strong authentication.

Thus, passwords remain the most popular means of user authentication. A typical user usually has several electronic devices and a number of logins and passwords for them. Login and password managing applications are used for safe storage of user authentication data. This data can be accessed from different devices. However, a user needs to remember login and password of the managing application. If this data is compromised, all other logins and passwords will be compromised as well.

Accordingly, a universal, efficient and convenient method for using an authentication token with mobile devices is desired.

SUMMARY OF THE INVENTION

Accordingly, the present invention is directed to a method for user authentication on a touch-screen device using an authentication token that substantially obviates one or more of the disadvantages of the related art.

In one aspect of the invention, a method and system for user authentication on a touch-screen device using an authentication token are provided. A housing of the authentication token includes several electrodes. At least one of the electrodes is located on the upper side of the token in order for the user to hold the token. The token is applied onto a touch-screen of the user mobile device by the user holding the electrode. In the preferred embodiment, other electrodes are located on the other (lower) side of the token housing. These electrodes come in contact with the touch-screen during the authentication procedure.

According to the exemplary embodiment, the body of the token contains executive units connected to the electrode held by the user and to one of the electrodes applied to the touch-screen. The body of the token includes a control module (e.g., a microprocessor) connected to the executive units in order to control their states. Upon receiving a signal from the control module, the executive unit can change its electric resistance. If the electric resistance of the executive unit is substantial, the electric connection does not exist and the capacity between the electrode held by the user and the applied to the touch-screen electrode is rather small. This way the touch-screen sensors do not register the touch at the point of application of the electrode. If the resistance is small, the electric connection between the token electrodes exists and the touch-screen sensors register a touch at the point of application of the electrode(s).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
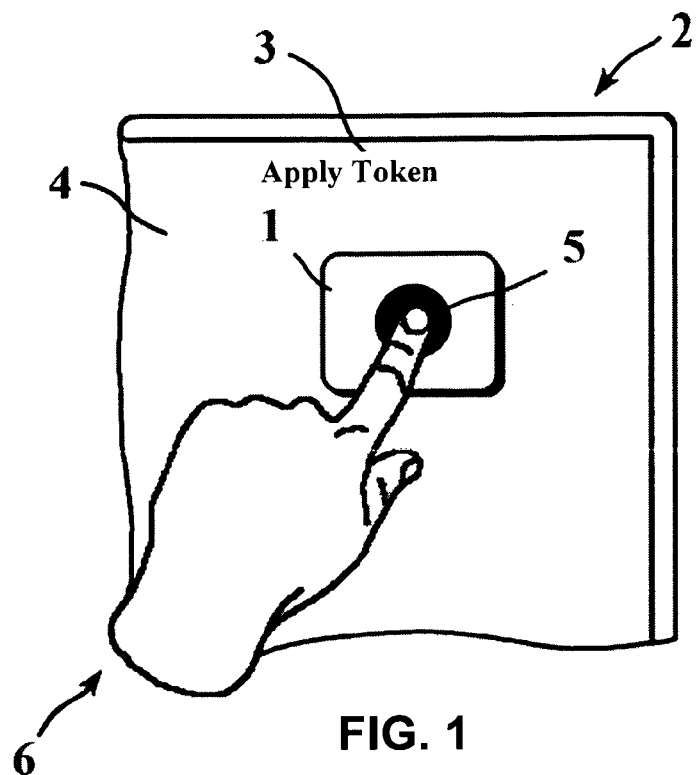
FIG. 1 illustrates a top view of an exemplary authentication token being applied to a touch-screen.

Reference will now be made in detail to the preferred embodiments of the present invention, examples of which are illustrated in the accompanying drawings.

In one embodiment, a method and system for user authentication on a touch-screen device using an authentication token are provided. A housing of the authentication token includes several electrodes. At least one of the electrodes is located on the upper side of the token in order for the user to hold the token. The token is applied onto a touch-screen of the user mobile device by the user holding the electrode. In the preferred embodiment, other electrodes are located on the other (lower) side of the token housing. These electrodes come in contact with the touch-screen during the authentication procedure.

According to the exemplary embodiment, the body of the token contains executive units connected to the electrode held by the user and to one of the electrodes applied to the touch-screen. The body of the token includes a control module (e.g., a microprocessor) connected to the executive units in order to control their states. Upon receiving a signal from the control module, the executive unit can change its electric resistance. If the electric resistance of the executive unit is substantial while the capacity between the electrode held by the user and the electrode(s) applied to the touch-screen is rather small, the touch-screen sensors do not register the touch at the point of application of the electrode(s). If the resistance is small, the electric connection between the token electrodes exists and the touch-screen sensors register a touch at the point of application of the electrode(s).

Thus, electric capacitance and conductivity of a human body affects signals transferred to touch-screens of a surface-capacitive type and a projective-capacitive type. The executive units can be implemented as an electronic switch or an optocoupler. In another embodiment, upon receiving a signal from the control module, the executive unit can change its capacitance. When the capacitance is sufficiently low, the capacitance between the held and applied electrodes can be low while the resistance is high enough so that the touch-screen sensors do not register the touch at the point of application of the electrode(s). If the capacitance of the executive units is relatively high, the capacitance between the electrodes increases to the point when the touch-screen sensors register the touch at the point of application of the electrode(s).

In this case, the properties of the human body can be used for passing the signals to the touch-screen of the projective-capacitive type. The executive units can be implemented as variable-capacitance diodes. The executive units of both of the above types can be used in the exemplary embodiment. However, the following description is directed to the executive devices that change their electric resistance upon receiving a signal from the control module. These executive units can be places into conductive and not-conductive states.

According to the exemplary embodiment, the executive unit of the token controlled by a microprocessor passes the control signals from the user's body through the held by the user and applied to the screen electrodes over specified time periods. Thus, the data is entered through the touch-screen in the same way as if it were entered by user finger touches performed at a very high speed. This eliminates a possibility of a visual interception completely. The entered authentication data can have a length, which is much longer than the one remembered by the user. Thus, the authentication is stronger against guessing attempts.

In one embodiment, the token can be implemented with only one electrode applied to the screen. However, a speed of data transmission will be low. Therefore, use of a token with several electrodes is preferred. A touch-screen multi-touch functionality can be used in order to have multiple executive units emulating multiple touches registered by the touch-screen sensors. This, advantageously, increases the data transmission speed and reduces the authentication time. According to the exemplary embodiment, the token sends and receives data automatically. The user does not need to read and enter any symbols for authentication on the mobile device. This eliminates mistakes during entry.

According to the exemplary embodiment, in order to protect against replication of data transferred by the token and to protect against fishing, the housing of the token contains a receiver, which receives signals from the touch-screen device for mutual authentication. In the present invention, an optical receiver is used in order to eliminate a possibility of radio interception of the transferred data. The body of the token can be implemented in different shapes based on convenience, desired authentication strength and speed, and versatility in terms of different models of the mobile devices and their touch screen sizes.

The token can be used with different security applications and system utilities. Special libraries, applets and plug-ins can be used in order to connect to other applications (e.g., an Internet browser) installed on the touch-screen mobile device. The authentication application can be used for a user device or can be a part of a distributed system including, for example, an authentication server.

The interface of the authentication application running on the mobile device can be implemented as an image or a screenshot in order to mask the authentication process. The authentication application provides for the two-factor authentication—prompt for a token user PIN and processing the PIN. Alternatively, a one-factor authentication can be used—i.e., the PIN is not required. The type of the authentication can either be selected by the user or it can be set by the administrator of the device being authenticated. The token can contain the authentication data for several devices, for which the first device serves as an access point. If the authentication is successful, the user is granted an access to the mobile device data or to other systems connected to the device. If an incorrect PIN and/or an incorrect authentication data are provided, the access to the mobile device is denied.

FIG. 1 illustrates a top view of an exemplary authentication token being applied to a touch-screen. The mobile device 2 displays a prompt 3 to a user to "apply token" to the touch-screen. The token 1 is applied to the screen 4 and held lightly by the electrode 5 located on the top of the token housing by a user hand 6. The mobile device 2 can be smart phone or another device with the touch screen.

Figure 2:
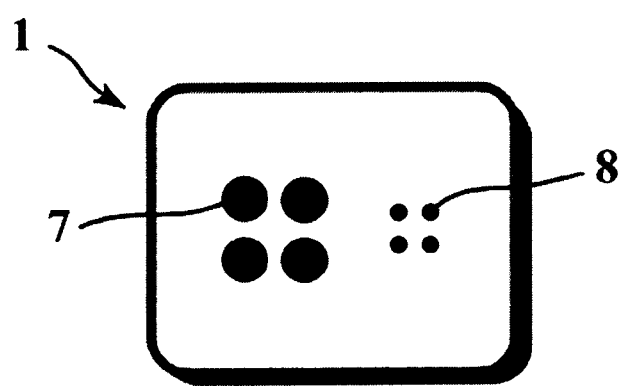
FIG. 2 illustrates a bottom view of authentication token, in accordance with the exemplary embodiment.

FIG. 2 illustrates a bottom view of authentication token, in accordance with the exemplary embodiment. The bottom side of the token 1 contains four electrodes 7 and four optical receivers 8 that are applied to the screen. Note that arbitrary number and shapes of the electrodes 7 and the optical receivers 8 can be used. The more electrodes and receivers are used, the faster is the speed of data transmissions and, ultimately, of the user authentication.

Figure 3:
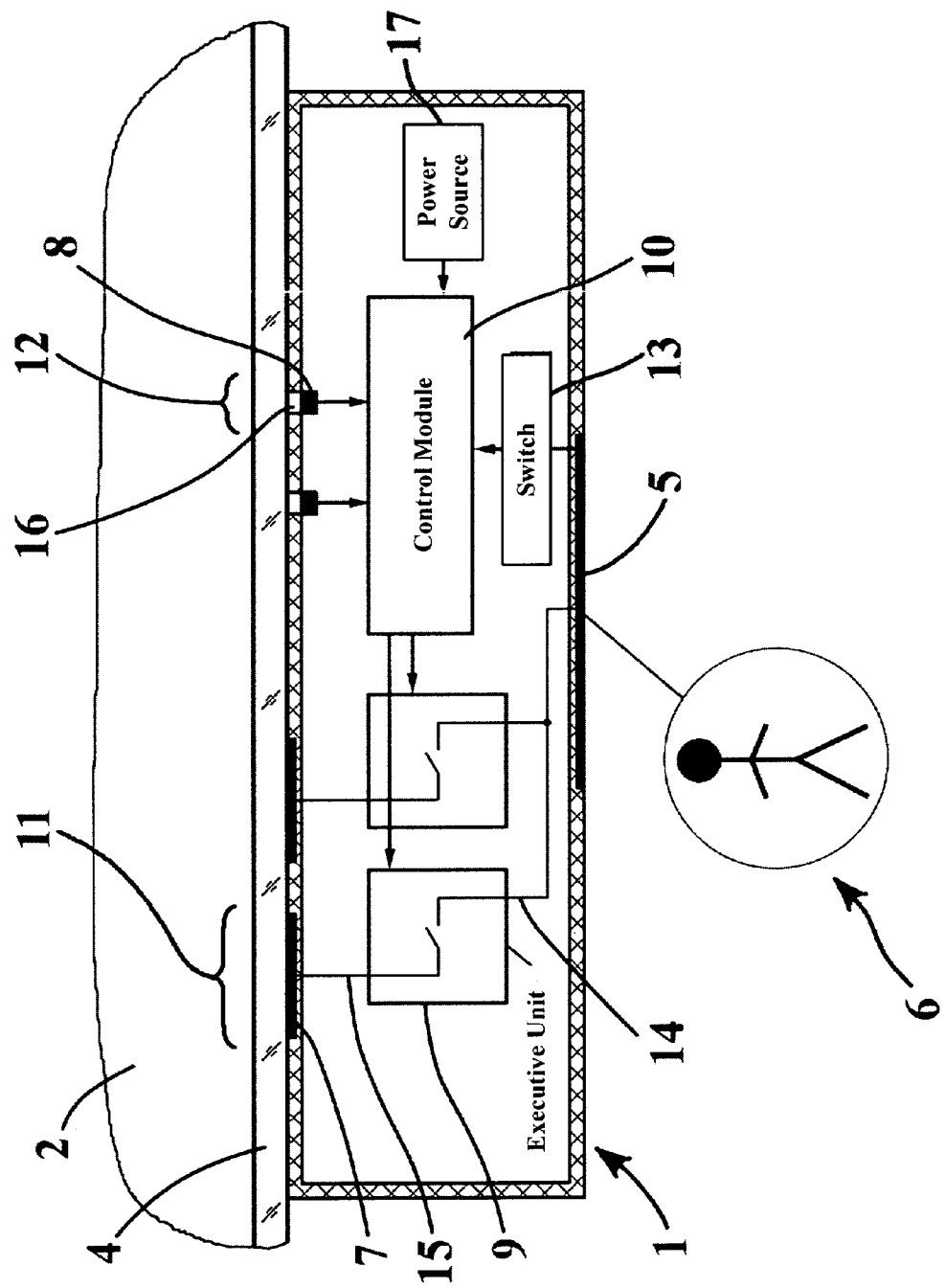
FIG. 3 illustrates an architecture (side view) of the authentication token, in accordance with the exemplary embodiment.

FIG. 3 illustrates architecture (side view) of the authentication token, in accordance with the exemplary embodiment. The housing of the token 1 is made of a dielectric material. The token 1 sends signals to the mobile device 2 equipped with the touch-screen 4 by changing the states of the executive units 9 from not-conductive to conductive and vise versa. The executive units 9 can be implemented as an optocoupler. The executive units 9 are connected to the control module 10. A number of screen areas 11, which have sensors that register touches triggered by the signals coming through the electrodes 7, correspond to the number and locations of the electrodes 7. These areas can be set by the authentication application of the device 2 based on the signals received from the token. The screen areas 11 are covered by the token 1 and cannot be seen by unauthorized users.

The token 1 receives the signals from the device 2 through the optical receivers 8 implemented as photo-diodes operating in a visible range. The receivers 8 are connected to the control module 10. The receivers 8 are facing the device screen 2 in order to receive the signals generated by the authentication application running on the mobile device 2. The signals can be represented by the levels of brightness of the screen areas 12 formed, for example, as circle or another image located next to each of the receivers 8. The areas 12 are generated by the authentication application in response to the signals received from the token 1. The areas 12 are covered by the body of the token 1, which eliminates a possibility of visual interception.

Prior to authentication, the control module 10 (e.g., a microprocessor) can be in energy saving mode. The authentication application configured to support communications with the token 1 is activated on the device 2. The token 1 is applied to the screen 4 and the user touches (or presses slightly) the electrode 5. At this point, the token switch 13 generates a token activation signal using the sensor located on the electrode 5. Then, the control module switches into a regular operation mode.

Then, the control block sends a sequence of signals (i.e., a message) defining position of the token 1—i.e., the positioning of the electrodes 7 and the receivers 8 on the screen 4. This message is sent to the device 2 by the control module 10 using the properties of the user's body acquired through the electrode 5, the executive units 9 and the electrodes 7 that trigger registration of touches by the touch-screen sensors in the corresponding areas 11.

The duration of the events registered by the touch-screen sensors corresponds to the duration of the signal produced by the control module 10. Then, the authentication application of the device 2 determines the positioning of the token 1 (i.e., the positioning of the receivers 8) based on the received message. The authentication application response to the message by displaying images (or sequences of images) in the screen areas 12 acquired by the receivers and interpreted as a message confirming activation of the control module 10.

Thus, in cases of false activations (when a user accidently touches the token electrode 5) without a confirmation message received through the receivers 8, the control module can switch to an energy saving mode. Alternatively, a message confirming activation is not used. The data reflecting activation of the token can be generated by an additional module connected to the receivers 8 and the control module 10, which operates while the control module 10 remains in the energy saving mode.

The token switch 13 can be implemented as an optical, a mechanical or a magnetic switch interacting with the electrode 5. In case of a mechanical switch, the electrode 5 can be either movable or flexible.

Subsequent to the activation, the token 1 and the device 2 send and receive authentication messages via the screen areas 11 and 12. The messages have to conform to a certain format (i.e., a message structure) and to the protocol (i.e., an order of the messages) that can confirm the integrity of the messages and provide for the data processing by standard error detection and correction means. If the token or the authentication application detects a message, which does not conform to the format, the message is excluded from further processing.

The message exchange can be implemented after the parameters of the signals passed between the token 1 and the device 2 are synchronized. The token can send a message to the device 2 at a low speed (which guarantees message delivery). Such message can reflect a token type, characteristics of a token's housing 1, sensors 7 and receivers 8. The device 2 can send a message informing the token about the speed of sending and receiving the signals depending on its state and properties (e.g., type, model, version, sensor properties, screen brightness, etc.). The synchronization process can consist of several cycles of message exchanges for determining a maximum speed at which the messages are sent without the errors (or errors can be corrected by error handling routines provided by the exchange protocol).

The subsequent message exchange can be implemented at a maximum speed for this device. In case of a large number of transmission/receiving errors, the speed can be reduced or the messages can be sent again. The exchange parameters can be saved by the token 1 or by the device 2 and the synchronization procedure can be minimized for the subsequent communications. In one embodiment, the device 2 can consider a touch, which occurred outside a token application area, as an accident. This touch is not accounted for. In another embodiment, such touch at a certain point of the screen can be used for changing the mode of operation. The token can be applied to any area of the screen at any angle as longs as all the electrodes and the sensors are touching the screen, except for the area of the screen where device 2 displays user prompts (see 3 in FIG. 1).

In yet another embodiment, the user prompts can appear automatically on the available screen areas. The user prompts can be switched off by the user. The electrodes 5 and 7 can be implemented as open sections of conducting metal. In one embodiment, the conducting parts of the electrodes 5 and 7 can be covered by a thin layer of a dielectric material (e.g., by a part of the housing, by paint or by polish) for protection from dirt and erosion or for hiding the use of the token. In this case, the area of the electrodes has to be sufficient for triggering the screen sensors without touching the screen. In one implementation, the electrode 5 can have a different shape, size and positioning (e.g., located at the front of the token) or it can be implemented as several connected elements.

A recommended minimal area of the electrode 7 providing for consistent operation of the sensors is empirically calculated at 0.000025 m$^2$. In any token implementation, the effects of shared capacitance of the electrodes 5 and 7 have to be minimized (e.g., by implementing an air pillow inside the housing of the token. Recommended capacitance for an executive unit 9 in a not-conducting state between the outputs 14 and 15 (without counting the capacitance of the housing and other parts of the token) is not to exceed 3.0 pF for the electrode with the area 0.000025 m$^2$. This data is produced by extensive experimentations. If the capacitance exceeds the above number, the transmission speed is reduced. It may also reduce the spectrum of the touch-screen device models that can be used for authentication by the proposed token.

According to the exemplary embodiment, the signal transmitted by the electrode 7 through the screen areas 11 can reflect one data bit or several bits. Each clock signal is synchronized by a change of a state of the signal produced by at least one of electrodes 7. In one embodiment, the executive units 9 can be implemented as an electro-magnetic switch (i.e., a relay). In another embodiment, the executable units 9 can be implemented as a movable electrode powered by a voice coil. This token can send signals by moving the electrode from an away from the screen position to the nest to the screen position and vise versa. However, these implementations cause higher energy usage and have lower transmission speed as compared to the implementation with the electronic switch.

In the exemplary embodiment, the receivers 8 can be located inside the openings 16 in the body of the token 1 close to its surface. This reduces exposure of the receivers 8 to the adjacent signaling areas 12. The direct contact of the receivers 8 with the touch-screen 4 is not required. Also, the token does not need to be pressed tightly against the screen provided that the receivers have sufficient sensitivity. The recommended frequency of transmission of the signals received into the receivers should not exceed 90% of the frequency of a touch-screen refresh rate. For example, if the touch-screen refresh frequency is 60 Hz a stable reception is achieved at signal frequency of 50 Hz. Maximum signal frequency recorded is 58 Hz, which can only be achieved with a certain type of the touch-screen device (i.e., processor, operation mode and the screen properties).

Each clock signal is synchronized by a change of a state of the signal send to at least one of the receivers 8. The state of other receivers is determined by the state of this receiver. The state of the receivers 8 can be determined by standard hardware/software means. The receivers can be implemented as a video modules or phototransistors. A matrix of photo-diodes operating in an optical visible range can be used. The sensitivity of the receivers 8 can be automatically adjusted according to brightness of the screen 4 by a control module 10. If the OS of the device 2 allows for programmable adjustment of the screen brightness, the token 1 can pass the data reflecting a preferred level of the screen brightness to the device 2.

In one embodiment, the token can be implemented without the receivers. This way a mutual authentication of the mobile device and the token is not used. Instead, only the user token is authenticated to the device. The control module can include a memory module or it can be implemented as a separate module. After completion of the authentication, the control module can turn into the energy saving mode. The token can use a lithium battery or any other suitable power source. Change of the battery does not cause a loss of data due to a use of special modules, such as a condenser. Additionally, the token can have an indicator (i.e., a light diode or a display) for displaying the modes of operation to the user. The housing of the token can be implemented as a souvenir or as a key chain.

Figure 4:
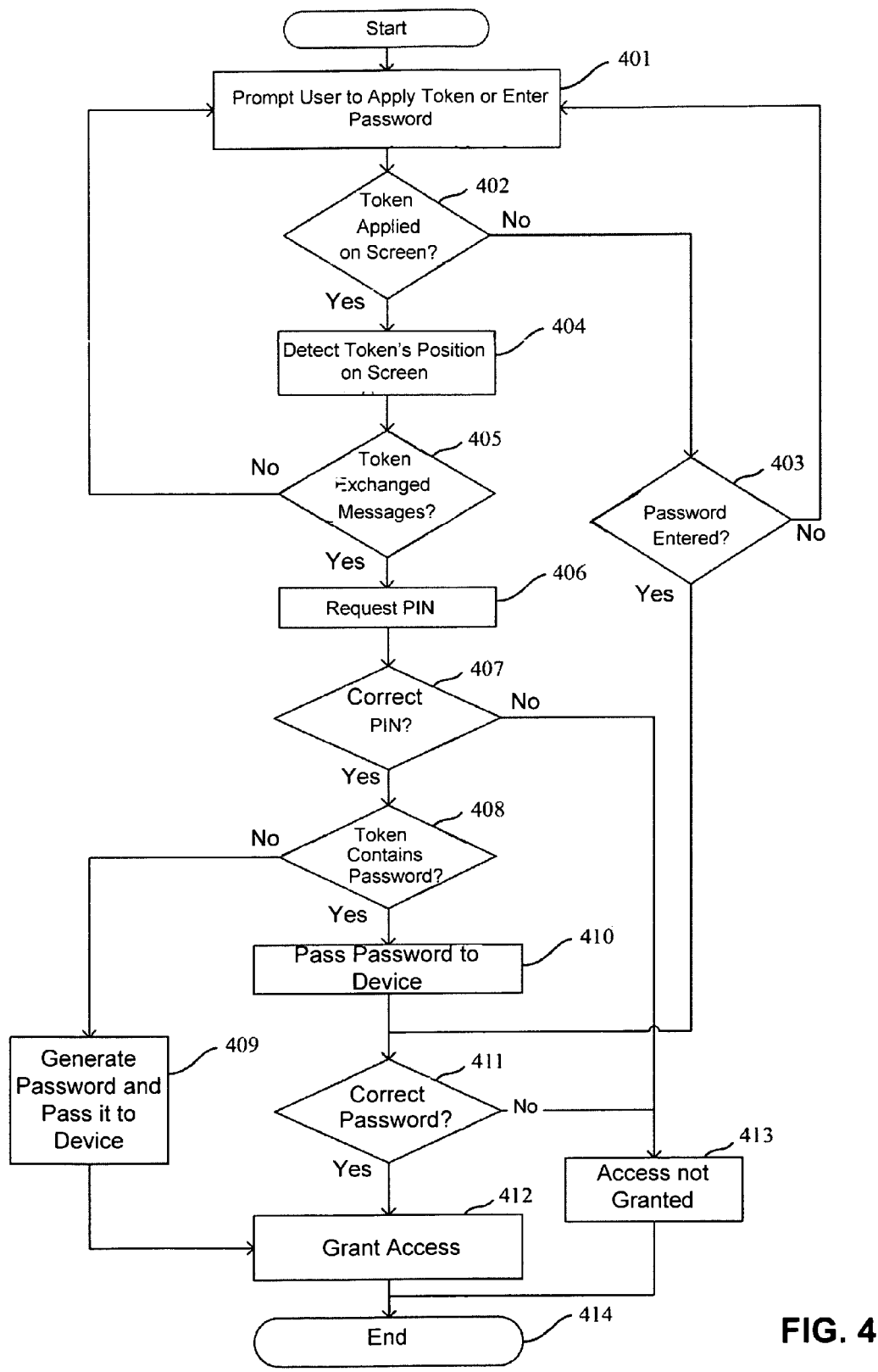
FIG. 4 illustrates a flowchart of an authentication method, which employs the authentication token, in accordance with the exemplary embodiment.

FIG. 4 illustrates a flowchart of an authentication method, which employs the authentication token, in accordance with the exemplary embodiment. An authentication application is activated on the mobile device. Then, in step 401, the authentication application prompts user to apply token or to enter a password. If the user enters a password and the token is not applied against the screen in step 402, the application checks if the password is entered in step 403. If the password is entered, the application checks if the password is correct in step 411. If the password is incorrect, the access to the device is not granted in step 413 and the process ends in step 414.

If, in step 402, the token is applied onto the screen, the application detects token's positioning on the screen in step 404. If the token exchanges message with the mobile device in step 405, the application requests a PIN from the token in step 406. Otherwise, the application prompts the user to apply the token in step 401. In step 407, the authentication application checks if the PIN is correct. If the PIN is correct, if the token contains a password in step 408, it passes the password to the mobile device in step 410. Otherwise, the token generates a password and passes it to the device in step 409. If the password is correct in step 411, the access is granted in step 412. Otherwise, access is not granted in step 413 and the process ends in step 414. Note that the password can be generated in hash form for transition security.

According to one embodiment, if the device does not receive any signals from the token over a certain time period, the device can generate a message informing the user to clean the surfaces of the screen and of the token. The device can acquire data reflecting the battery charge of the token and inform the user if it is necessary to charge it or change the battery. If a certain number of message of a correct format, but sent and received out if order (i.e., using a wrong protocol), are detected by the device (or by the token), the token can enter into a temporarily locked mode. The user is informed by a message on the screen, or by SMS or by email, etc.

In order to provide for additional security for the token, the token can be linked to a particular device by saving the parameters of the token. Alternatively, the token can be linked to several user devices, but have to authenticated to these devices in a certain order. The can be used to access certain applications or data on the user device. The token's microprocessor can be protected from reading its code and data by configuration utilities. The messages exchanged between the token and the device can be encrypted, scrambled, marked for defining the latest successful authentication session. The token can be implements as a stationary device and the mobile devices can be brought in contact with it. Note that a digital signature or certificate can be used instead of the PIN.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A token for authentication of a user to a touch-screen device, the token comprising:
   a token housing made of dielectric material;
   a control module configured to send signals to executive units;
   a plurality of electrodes connected to the executive units and attached to a bottom surface of the token housing and configured to be placed in a proximity of a touch-screen of a device;
   at least one electrode connected to the executive units and attached to an upper surface of the housing and configured to be held by a user in order to apply the token onto a touch-screen of the mobile device; and
   a plurality of optical sensors configured to receive signals from the mobile device via the touch-screen and to pass the signals to the control module,
   wherein:
   the control module is configured to send a logical signal to the electrode attached to the upper surface of the token housing and to the electrodes attached to the bottom surface of the token housing; and
   the executive units are configured to acquire a state for transforming the signal received from the control module into an authentication sequence of signals sent to the electrodes that trigger touch events on the touch screen of the mobile device,
   wherein an electric capacitance and conductivity of a user's body is used for providing control input signals to the touch-screen via the electrode attached to the upper surface of the housing and held by the user during application of the token onto the touch-screen of the mobile device.

2. The token of claim 1, wherein the electrode configured to be held by the user is located on a side wall of the token housing.

3. The token of claim 1, wherein the executive units change their state upon receiving the signal from the control module by changing their electrical resistance.

4. The token of claim 1, wherein the executive units change their state upon receiving the signal from the control module by changing their electrical capacitance.

5. The token of claim 1, wherein the electrodes attached to the bottom surface of the token housing are configured to move in different directions for generating an authentication sequence of signals.

6. The token of claim 1, further comprising a switch for automated activation of the token upon receiving a signal from the mobile device.

7. The token of claim 1, further comprising a battery charge indicator connected to a display.

8. The token of claim 1, wherein the optical sensors are located inside openings in the housing of the token below the surface of the token.

9. The token of claim 1, wherein the housing of the token is implemented as a key chain.

10. The token of claim 1, wherein the electrode located on the upper surface of the housing is grounded in order to use a control input from earth.

11. The token of claim 1, wherein the executive units are any of:
   electro-magnetic switches;
   variable-capacitance diodes; and
   optocouplers.

12. The token of claim 1, further comprising additional control unit.

13. The token of claim 1, further comprising a housing which camouflages the token as a data transmitting device.

14. A method for data transmitting/receiving using the token comprising:
   a token housing made of dielectric material;
   a control module configured to send signals to executive units;
   a plurality of electrodes connected to the executive units and attached to a bottom surface of the token housing and configured to be placed in a proximity of a touch-screen of a device;
   at least one electrode connected to the executive units and attached to an upper surface of the housing and configured to be held by a user in order to apply the token onto a touch-screen of the mobile device; and
   a plurality of optical sensors configured to receive signals from the mobile device via the touch-screen and to pass the signals to the control module,
   wherein:
   the control module is configured to send a logical signal to the electrode attached to the upper surface of the token housing and to the electrodes attached to the bottom surface of the token housing; and
   the executive units are configured to acquire a state for transforming the signal received from the control module into an authentication sequence of signals sent to the electrodes that trigger touch events on the touch screen of the mobile device,
   wherein an electric capacitance and conductivity of a user's body is used for providing control input signals to the touch-screen via the electrode attached to the upper surface of the housing and held by the user during application of the token onto the touch-screen of the mobile device; and
   the method comprising activating an application for interaction with the token, wherein:
   at least one electrode connected to the executive units and attached to an upper surface of the housing and configured to be held by a user in order to apply the token onto a touch-screen of the mobile device; and
   a plurality of optical sensors configured to receive signals from the mobile device via the touch-screen and to pass the signals to the control module.

15. The method of claim 14, wherein application interface allows for camouflaging of the data transmitting/receiving process.

16. The method of claim 14, wherein the token does not touch the touch-screen and is held by the electrode by the user during application of the token near the touch-screen of the mobile device.

17. The method of claim 14, wherein the token touches the touch-screen and is held by the electrode by the user during application of the token to the touch-screen of the mobile device.

18. A device for authentication of a user to a touch-screen device, the device comprising:
   a housing made of dielectric material;
   a control module configured to send signals to executive units;
   a plurality of electrodes connected to the executive units and attached to a bottom surface of the housing and configured to be placed in a proximity of a touch-screen of a device;
   at least one electrode connected to the executive units and attached to an upper surface of the housing and configured to be held by a user in order to apply the device onto a touch-screen of the mobile device.

19. The device of claim 18, further comprising an executive unit capable of changing its electrical resistance upon receiving signals from the control unit.

20. The device of claim 18, further comprising an executive unit capable of changing its electrical capacitance upon receiving signals from the control unit.

21. The device of claim 18, further comprising a data receiving unit connected to the control unit.

22. The device of claim 18, further comprising an indicator or a display.

23. The device of claim 18, further comprising an additional control unit.

24. A method for authentication of a user to a touch-screen device, comprising:
   a housing made of dielectric material;
   a control module configured to send signals to executive units;
   a plurality of electrodes connected to the executive units and attached to a bottom surface of the housing and configured to be placed in a proximity of a touch-screen of a device;
   at least one electrode connected to the executive units and attached to an upper surface of the housing and configured to be held by a user in order to apply the device onto a touch-screen of the mobile device; and
   the method comprising:
   activating an application for interaction with the device, wherein:
   at least one electrode connected to the executive units and attached to an upper surface of the housing and configured to be held by a user in order to apply the device onto a touch-screen of the mobile device; and
   a plurality of optical sensors configured to receive signals from the mobile device via the touch-screen and to pass the signals to the control module.

* * * * *